United States Patent [19]

Bentley et al.

[11] Patent Number: 4,759,019
[45] Date of Patent: Jul. 19, 1988

[54] PROGRAMMABLE FAULT INJECTION TOOL

[75] Inventors: Paul C. Bentley, Birmingham, Ala.; Jack W. Kemp, Round Rock, Tex.

[73] Assignee: International Business Machines Corporation, Armonk, N.Y.

[21] Appl. No.: 884,231

[22] Filed: Jul. 10, 1986

[51] Int. Cl.[4] .................................... G06F 11/22
[52] U.S. Cl. ........................... 371/3; 364/200; 371/23
[58] Field of Search ............... 371/3, 17, 23; 364/200, 364/900

[56] References Cited

U.S. PATENT DOCUMENTS

| | | | |
|---|---|---|---|
| 3,257,546 | 6/1966 | McGovern | 371/3 |
| 3,813,531 | 5/1974 | King et al. | 371/17 |
| 3,961,250 | 6/1976 | Snethen | 324/73 R |
| 4,156,132 | 5/1979 | Hazzard | 371/23 |
| 4,204,633 | 5/1980 | Goel | 371/23 X |
| 4,223,382 | 9/1980 | Thorsrud | 364/200 |
| 4,308,616 | 12/1981 | Timoc | 371/23 |
| 4,542,505 | 9/1985 | Biroeder et al. | 371/3 |

OTHER PUBLICATIONS

R. L. Cormier et al., Computer Fault Generator, IBM Technical Discl. Bulletin, vol. 11, No. 8, Jan. 1969, pp. 924-926.
J. N. Gaulrapp et al., Error Injector Tool, IBM Technical Discl. Bulletin, vol. 20, No. 8, Jan. 1978, p. 3286.
D. A. Ring, Protected Jumper Fault Instrument, IBM Technical Discl. Bulletin, vol. 22, No. 11, Apr. 1980, p. 4875.
Millham et al., Logical Assembly Testing System, IBM Technical Disclosure Bulletin, vol. 14, No. 11, Apr. 1972, pp. 3446-3449.
Chao et al., Fault Isolations in Shift Register Latches, IBM Technical Disclosure Bulletin, vol. 18, No. 4, 9/75, pp. 1065-1067.
Bossen et al., Model for Transient and Permanent Error Detection and Fault Isolation Coverage, IBM Journal of R&D, vol. 26, No. 1, Jan. 1982, pp. 67-77.
Tendolkar et al., Automated Diagnostic Methodology for the IBM 3081 Processor Complex, IBM Journal of R&D, vol. 26, No. 1, Jan. 1982, pp. 78-88.

Primary Examiner—Charles E. Atkinson
Attorney, Agent, or Firm—Curtis G. Rose; T. Tyson; M. H. Klitzman

[57] ABSTRACT

A programmable fault injection tool (PFIT) for the texting of the diagnostic capabilities of a computer or digital processing system is disclosed. The PFIT is made up of event compare hardware and error injection hardware.

The event compare hardware of the PFIT is user programmable through menu-driven software to compare a particular stored event, either a digital word or sequence of words, with an event measured within the system under test. The stored event can be changed by the user under program control so as to provide a generalized fault injection tool. In addition, the tool includes a mask memory that allows certain bits in a word to be masked, or ignored, when the state of the bit within the word is inconsequential.

The error injection hardware of the PFIT is controlled by the event compare hardware to inject faults by short circuiting voltage nodes within the system under test to ground or a supply voltage. The error injection hardware will inject the fault for a user specified time duration and only after a user specified time delay.

13 Claims, 12 Drawing Sheets

FIG. 13.

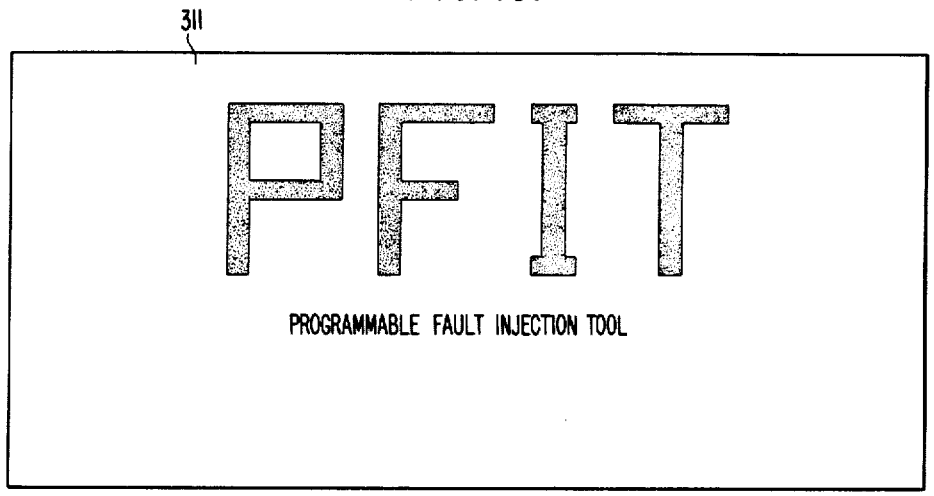

PROGRAMMABLE FAULT INJECTION TOOL

FIG. 14.

```
          PROGRAMMABLE FAULT INJECTION TOOL (VERSION 2.0)
BUG NAME : _____          BUG LOCATION : _____
TEST PIN :  _  (1 - 64)      BUG LEVEL :  _  (0 = PULL-DOWN, 1 = PULL-UP)
BUG TYPE :  _    (I = INTERMITTENT, S = SOLID)
DELAY    :  _____ USEC (0.1 TO 1500000.0 MICROSECONDS)
DURATION :  _____ USEC (0.1 TO 1500000.0 MICROSECONDS)
CLOCK    :  ____  (POS, NEG, OR NONE) CLOCK LOCATION : _____
SEQUENCE COUNT :  __  (1 - 4096)
RETRY COUNT    :  __  (0-255) ( > 255 = CONTINUOUS )
COMMENTS : _____
```

F1INJECT F2MAIN F3L 1&2 F4R 1&2 F5L 3&4 F6R 3&4 F7SAVE F8REVISE F9LOAD F10END

FIG. 15.

| PFIT DATA MENU | 0=LO, 1=HI, BLANK = DON'T CARE | | LINE DEFINITIONS |
|---|---|---|---|

FIINJECT F2MAIN F3L 1&2 F4R 1&2 F5L 3&4 F6R 3&4 F7SAVE F8REVISE F9LOAD F10END

FIG. 16.

PROGRAMMABLE FAULT INJECTION TOOL

TECHNICAL FIELD

The invention relates to fault simulation used in the testing of digital processing systems.

BACKGROUND

Modern digital processing hardware is becoming more and more sophisticated in its incorporation of automated diagnostics. A digital processing system with automated diagnostics can be capable of several different functions including fault detection and fault isolation. Faults or failures within these digital processing systems typically manifest themselves as short circuits between a particular voltage node or net and either ground or a voltage supply. These faults are generally termed stuck-at-1, stuck-at-0, or intermittent at 1 or 0. Once a fault is isolated by the diagnostics, the system can be quickly repaired thereby reducing down-time and increasing productivity. This makes automated diagnostics a very valuable feature in modern digital processing.

Examples of systems incorporating automated diagnostics in complex digital processing systems are documented in N. N. Tendolkar and R. L. Swann, "Automated Diagnostic Methodology for the IBM 3081 Processor Complex," *IBM J. Res. Develop.*, Vol. 26, No. 1, January 1982 at 78–88, and in D. C. Bossen and M. Y. Hsiao, "Model for Transient and Permanent Error-Detection and Fault-Isolation Coverage," *IBM J. Res. Develop.*, Vol. 26, No. 1, January 1982 at 67–77. These articles describe systems for identifying and isolating both stuck-faults and intermittent faults in highly complex digital processing systems with confidence levels in the 90–95% range.

A very significant problem associated with such fault tolerant systems is determining their effectiveness in performing the intended tasks of fault identification and isolation. Heretofore, these systems were tested by manually introducing errors into the fault tolerant systems and then analyzing the results produced by the diagnostics to determine if the introduced fault was identified.

One existing method of introducing stuck faults is to simply short circuit a voltage node within the system to ground (stuck-at-0) or to a supply voltage (stuck-at-1). This method works well for simulating short circuits on busses but fails to simulate stuck faults within modules and fails to simulate intermittent faults.

A known method of introducing intermittent faults is to momentarily short circuit a voltage node within the system to ground or a supply voltage. This method has the same limitations as the stuck fault method of injection in that it is impossible to simulate faults at voltage nodes other than those readily accessible. In addition, with the manual injection of intermittent faults, it is virtually impossible to time the injection of the fault with the operation of the system under test. Intermittent faults cannot be placed in time relative to a particular state of a system under test and, therefore, a complete and thorough test is never guaranteed.

SUMMARY OF THE INVENTION

The present invention resolves the problems associated with prior error injection apparatus by presenting a programmable fault injection tool including event compare hardware which controls error injection hardware.

The event compare hardware is user programmable to compare a particular stored event, comprising a digital word or sequence of words, with an event measured within the system under test. The stored event can be changed by the user under program control so as to provide a generalized fault injection tool. In addition, the tool includes a mask memory that allows certain bits in an word to be masked, or ignored, when the state of the bit within the word is inconsequential.

The error injection hardware is controlled by the event compare hardware to inject faults by short circuiting voltage nodes within the system under test to ground or a supply voltage. The error injection hardware will inject the fault for a user specified time duration and only after a user specified time delay.

In light of the foregoing, it is a primary object of the invention to provide a fault injection tool that allows the predictable recreation of faults within a digital system under test at a specified time relative to a unique state of the system.

This and other objects, features, and advantages will become apparent from the following detailed description of the preferred embodiment with reference to the drawing.

BRIEF DESCRIPTION OF THE DRAWING

FIG. 13 is the PFIT logo screen of the invention.

FIG. 14 is the main menu of the invention.

FIG. 15 is the compare 1 and 2 menu of the invention.

FIG. 16 is the compare 3 and 4 menu of the invention.

DETAILED DESCRIPTION OF THE PREFERRED EMBODIMENT

Figure 1:
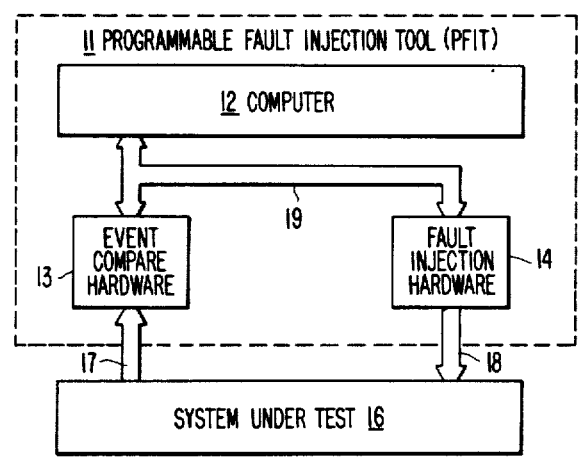
FIG. 1 is a block diagram of the subject invention attached to a system under test.

Referring to FIG. 1, programmable fault injection tool (PFIT) 11 is connected through event compare bus 17 and fault injection bus 18 to system under test 16. PFIT 11 comprises general purpose digital computer 12, event compare hardware 13, and fault injection hardware 14.

Computer programs (detailed later with reference to FIGS. 5–10), stored in computer 12 are used to initialize compare hardware 13 and injection hardware 14 with data including: the event to be compared; the type of fault to be injected; the sequence count; the retry count; the test pin; the bug level; the clocking; and the time duration and time delay of the fault. These values can be changed by a user of PFIT 11. The placement of the terminations of busses 17 and 18 can also be changed within system 16 to test the response of any system 16 to the injection of any predetermined fault at any predetermined time.

Data bus 19 is used to carry communication between compare hardware 13, injection hardware 14 and computer 12. In the preferred embodiment, computer 12 is an IBM Personal Computer (PC) manufactured by International Business Machines Corporation of Armonk, N. Y. The details of operation of the IBM PC are presented in the "*IBM PC Technical Reference Manual*", April, 1984, Document Order Number 6361453, IBM Corp., Armonk, N.Y., expressly incorporated herein by reference.

Figure 2:
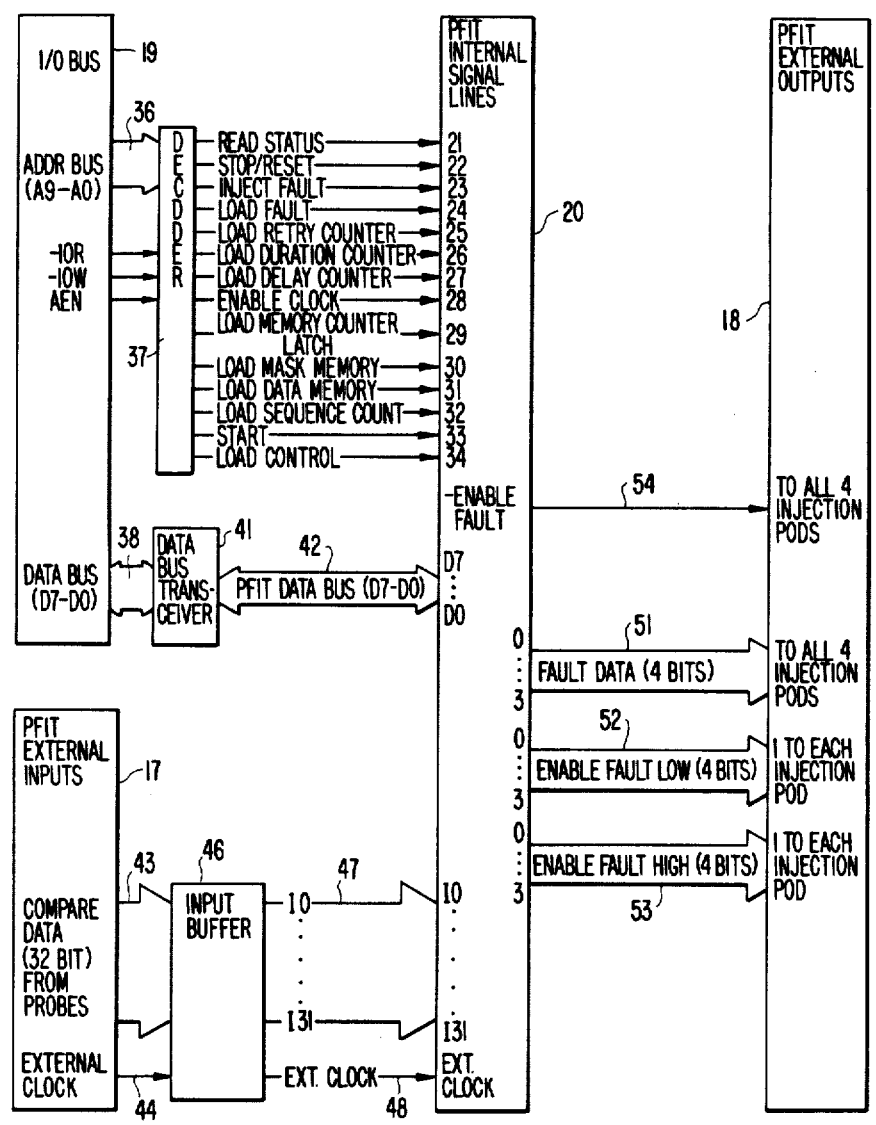
FIG. 2 is a detailed schematic of the interfaces of FIG. 1.

FIG. 2 is a diagram of the data bus structure within PFIT 11 of FIG. 1. Referring to FIGS. 1 and 2, bus 19 carries digital communication between computer 12 and hardware 13 and 14. Busses 17 and 18 carry digital communications between system 16 and hardware 13 and 14, respectively. Bus 20 contains digital signal lines internal to PFIT 11.

Bus 19 comprises address bus 36, data bus 38, and control lines AEN, IOR, and IOW. When information is transferred to and from computer 12, address bus 36 is decoded by decoder 37 to activate one of lines 21-34 which are each active low. Address enable signal (AEN), when active high, is used to disable decoder 37 to ensure that the PFIT is disabled during DMA data transfers. When I/O read (IOR) is active low, data is read from data bus 38 into computer 12. When I/O write (IOW) is active low, data is written from computer 12 to PFIT data bus 42.

Data bus transceiver 41 transmits and receives data between computer data bus 38 and PFIT data bus 42. In the preferred embodiment, address bus 36 is a ten bit bus, and data busses 38 and 42 are both eight bit busses.

Compare data derived from preselected voltage nodes within system under test 16 (FIG. 1) enters PFIT on compare data bus 43. In the preferred embodiment, compare data bus 43 is a thirty-two bit bus with each bit line connected to a respective voltage probe that can be placed on voltage nodes within system under test 16 (FIG. 1). In addition, a clock signal is taken from system under test 16 on line 44. Compare data bus 43 and external clock line 44 are buffered by input buffer 46 and placed on buffered compare data bus 47 and buffered external clock line 48, respectively.

By sensing the system under test 16 via compare data bus 43 and clock line 44, PFIT 11 can determine the present state of system 16 thereby facilitating the predictable, recreateable injection of fault conditions into system 16 with respect to that sensed present state. It should be noted that, although compare data bus 43 carries thirty-two bits of digital information in the preferred embodiment, the subject invention can be used when less than thirty-two bits of information is to be sensed simply by ignoring those signals present on bit lines not used. In addition, it is within the ability of one skilled in the art to modify the preferred embodiment to use more than thirty-two bits.

Four bit fault data bus 51, four bit enable fault low bus 52, four bit enable fault high bus 53, and enable fault line 54 are decoded by four fault injection pods (not shown) to control the injection of either a high fault (1) or a low fault (0) on one of 64 possible voltage nodes within system 16 (FIG. 1) at a predetermined time.

Each bit line in fault data bus 51 is connected to each of the four injection pods. The individual injection pods decode fault data bus 51 to enable a respective one of 16 fault injection lines connected to each pod, each line, in turn, being connected to a voltage node within system 16.

Each bit line in enable fault bus 52 and 53 is connected to a respective one of the four injection pods. At any given time, only one bit line of the eight bit lines constituting busses 52 and 53 is active. Therefore, the information contained on busses 51, 52, and 53 is used to enable one of 64 fault injection lines to inject either a "1" fault or a "0" fault. The enabled fault injection line is then activated to inject the requested fault when enable fault line 54 is active low.

Figure 3:
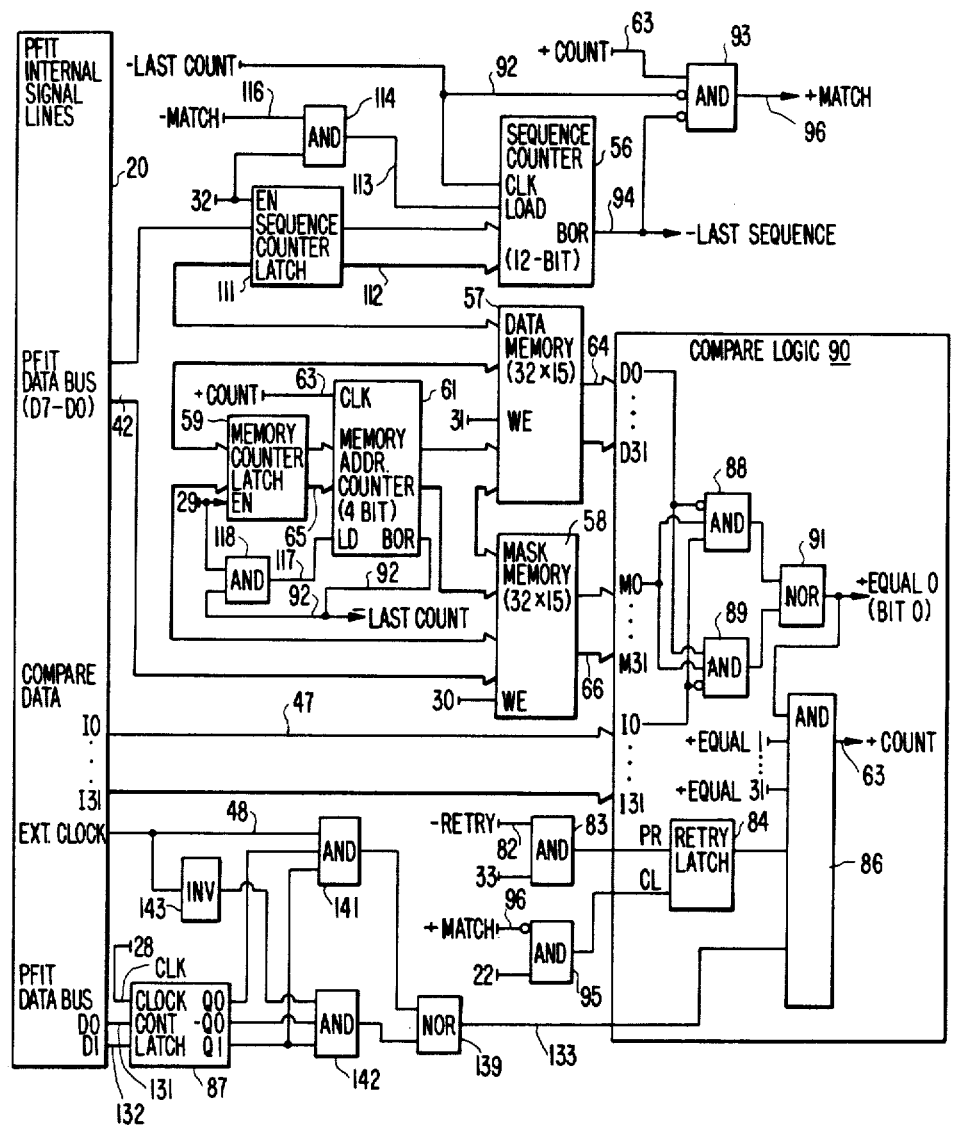
FIG. 3 is a detailed schematic of the event compare hardware of FIG. 1.
Figure 4:
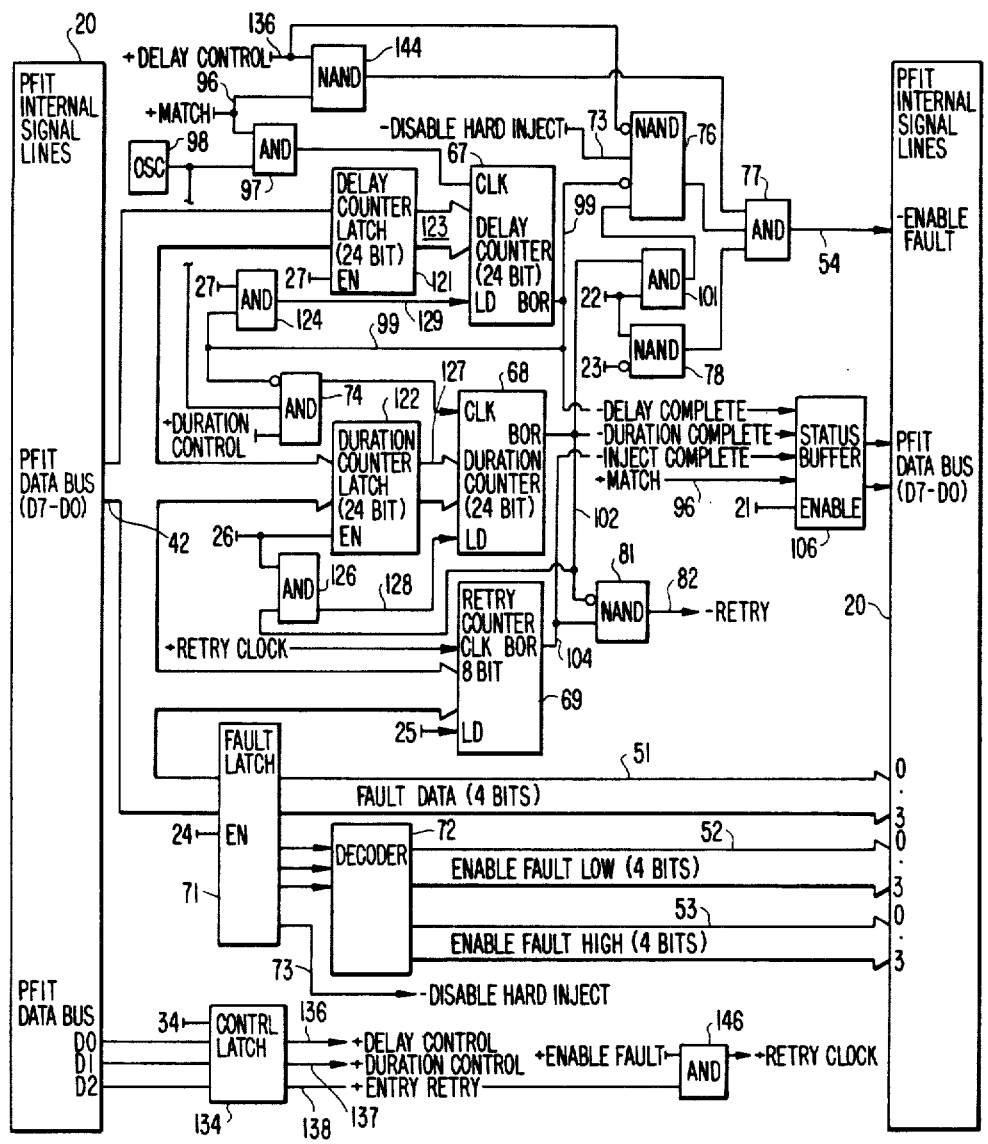
FIG. 4 is a detailed schematic of the injection hardware of FIG. 1.
Figure 8:
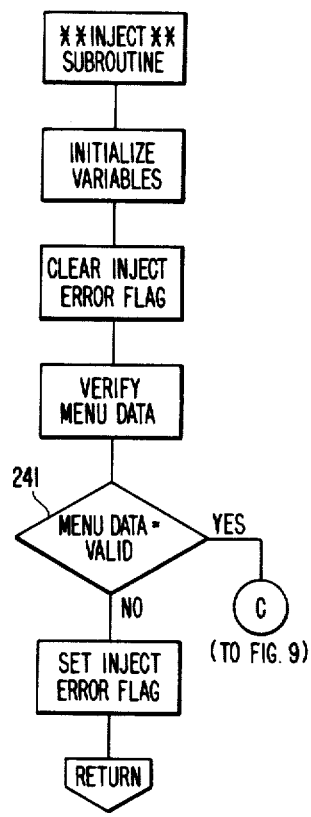
FIGS. 8–10 show a flow chart of the flow of control of the fault inject procedures according to the invention.
Figure 9:
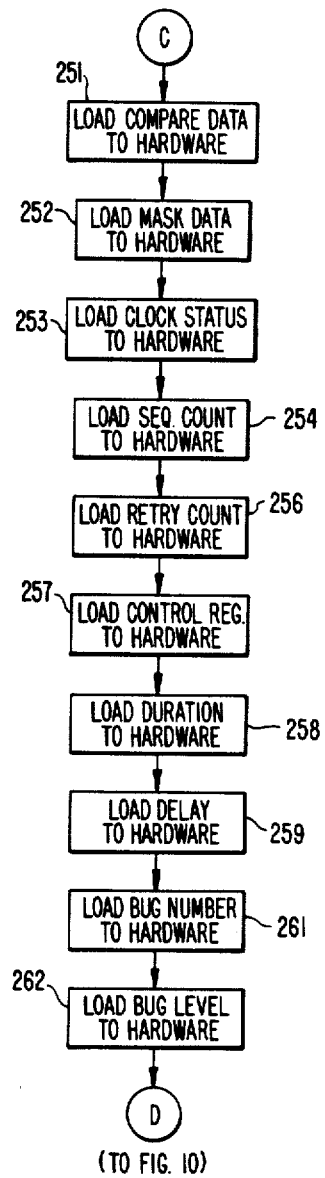
Figure 10:
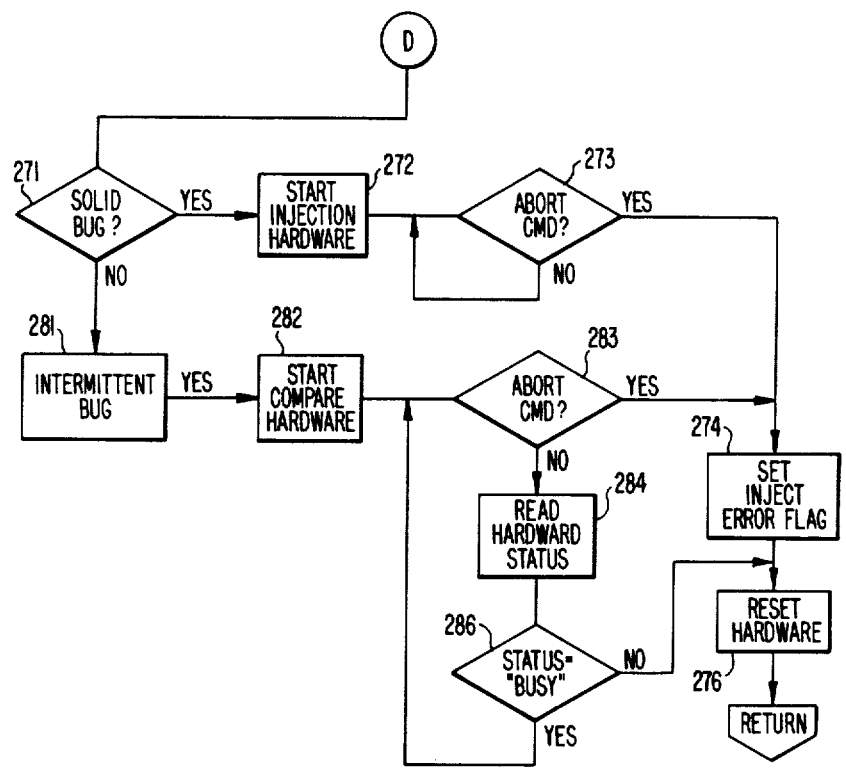

The detailed operation of the hardware shown in FIGS. 3 and 4 will be fully disclosed when the flow of control of the fault inject procedures shown in FIGS. 8-10 is described.

Figure 5:
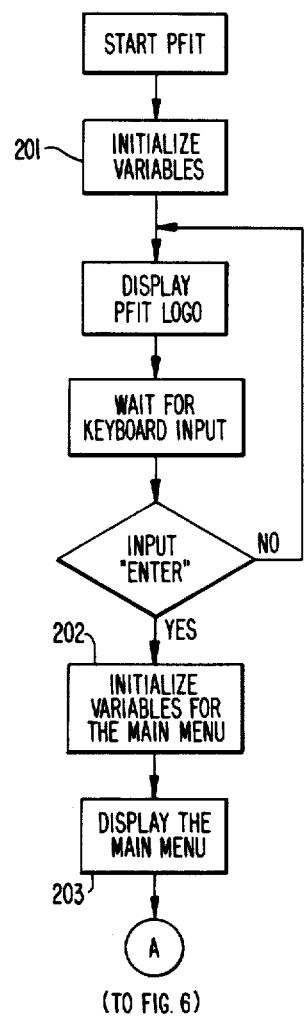
FIGS. 5–7 show a flow chart of the flow of control of the data entry procedures according to the invention.
Figure 6:
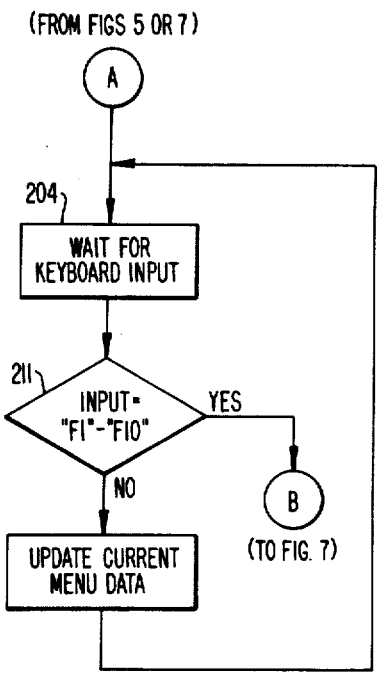
Figure 7:
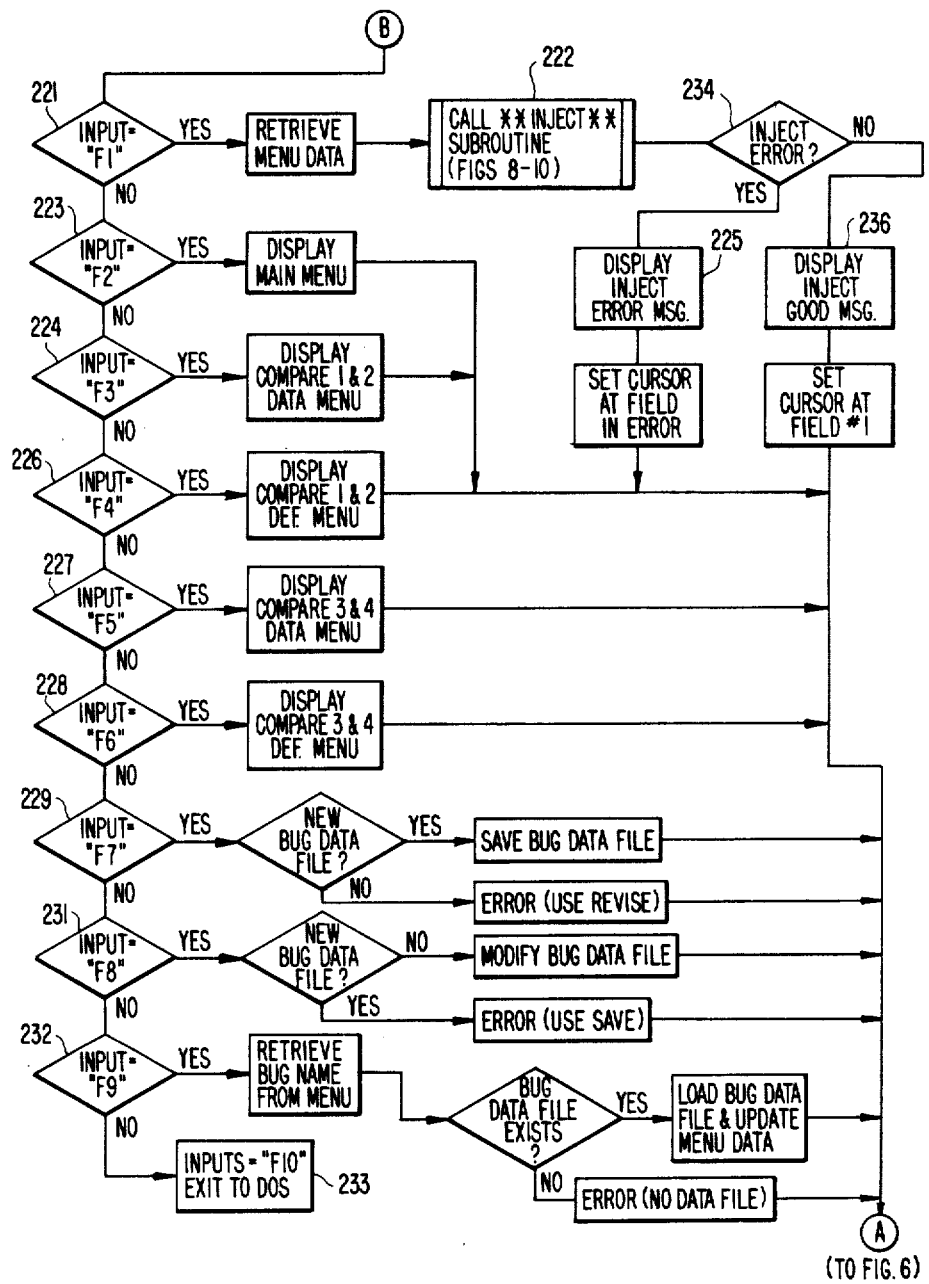

Referring now to FIGS. 5-7, a flow chart of the flow of control of the data entry procedures is illustrated. In the preferred embodiment, the flow of control is performed by computer programs stored in computer 12, preferably an IBM Personal Computer.

FIG. 5 shows how the PFIT program is started. After initializations are performed in block 201, PFIT logo screen 311 (FIG. 13) is displayed and the program waits for the user to press enter on the computer keyboard. After additional program initialization in step 202, main menu 401, shown in FIG. 14, is displayed to the user in block 203. It is obvious to one skilled in the art that the format and design of the main menu screen is largely a design choice of the programmer and the invention can be embodied using many different main menu screens.

The flow chart continues in FIG. 6. The program waits for input from the user in block 204. Any inputted data other than a function key is used to update the data in main menu 401. When the user presses any of the function keys F1-F10, as shown in decision block 211, the flow of control goes to FIG. 7.

FIG. 7 shows the action taken in response to the user pressing a function key. If the user has pressed function key F1, as shown in decision block 221, the menu data is retrieved and the inject subroutine is called in block 222. The inject subroutine is shown in detail in FIGS. 8-11 and will be described later.

Again referring to FIG. 7, if the user has pressed function key F2, as shown in decision block 223, the main menu is displayed and the program again waits for keyboard input, as shown in block 204 of FIG. 6.

If the user has pressed function key F3, as shown in decision block 224, compare 1 and 2 menu 421 is displayed, as shown in FIG. 15. The user is able to input data into the PFIT data menu portion 422 of FIG. 15. Note that any data other than a "0" or a "1" inputted in menu portion 422 is considered a "don't care" and is ignored by the program. The program again waits for keyboard input, as shown in block 204 of FIG. 6.

If the user has pressed function key F4, as shown in decision block 226, compare 1 and 2 menu 421 is displayed, as shown in FIG. 15. The user is able to input data into line definitions portion 423 of FIG. 15. Note that menu portion 423 is used solely to document the probe connections in portion 422 and is not used by the hardware. The program again waits for keyboard input, as shown in block 204 of FIG. 6.

Figure 16:
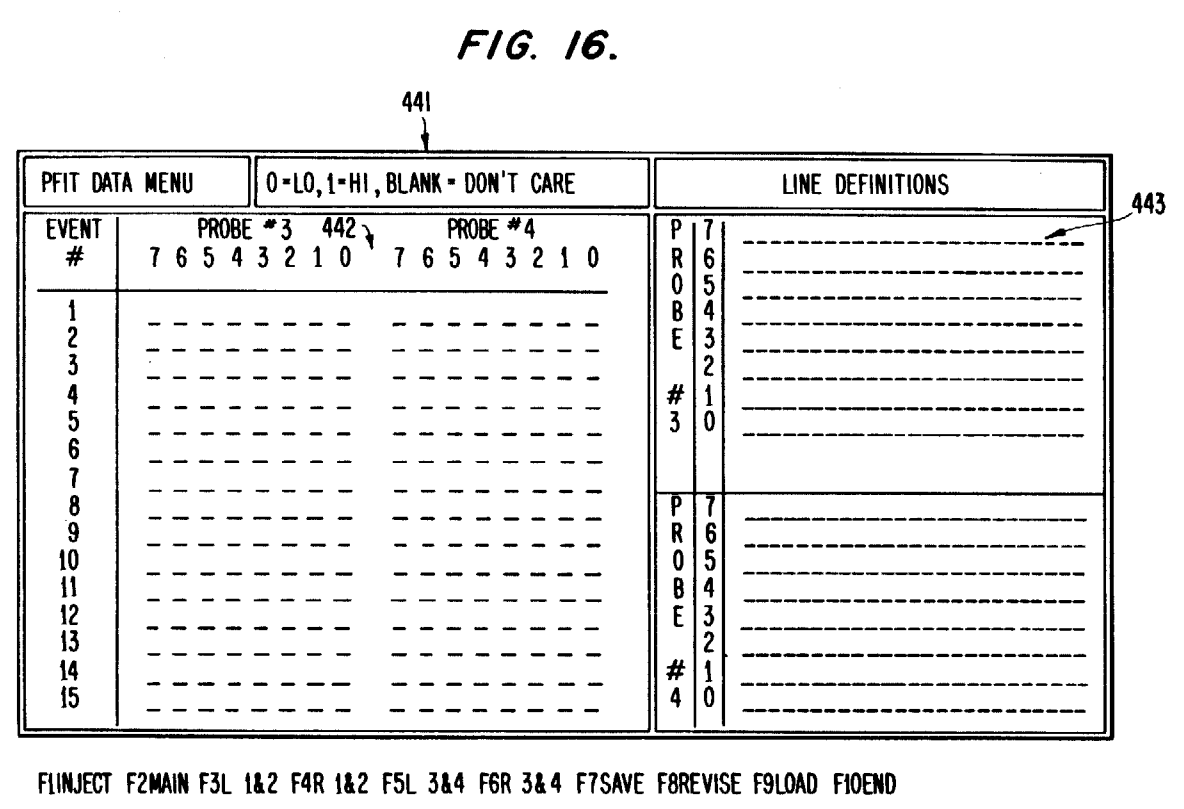

If the user has pressed function key F5, as shown in decision block 227, compare 3 and 4 menu 441 is displayed, as shown in FIG. 16. Menu 441 is identical to menu 421, except data for probes 3 and 4 are displayed instead of probes 1 and 2. The user is able to input data into PFIT data menu portion 442 of FIG. 16. The program again waits for keyboard input, as shown in block 204 of FIG. 6.

If the user has pressed function key F6, as shown in decision block 228, compare 3 and 4 menu 441 is displayed, as shown in FIG. 16. The user is able to input data into line definitions portion 443 of FIG. 15. The program again waits for keyboard input, as shown in block 204 of FIG. 6.

If the user has pressed function key F7, as shown in decision block 229, menu information is saved on disk or diskette for bug name 402 (FIG. 14). If bug name 402 has previously been saved, the user is instructed to use the revise option, function key F8, instead. The program again waits for keyboard input, as shown in block 204 of FIG. 6.

If the user has pressed function key F8, as shown in decision block 231, the menu data is retrieved for bug name 402 (FIG. 14) and the bug data file is revised. This option is used to revise a previously stored file with new data input by the user. If bug name 402 has not previously been saved, the user is instructed to use the save option, function key F7, instead. The program again waits for keyboard input, as shown in block 204 of FIG. 6.

If the user has pressed function key F9, as shown in decision block 232, data previously saved away on disk or diskette for bug name 402 (FIG. 14) is loaded into the main menu. If bug name 402 has not previously been saved, an error message appears in the screen. The program again waits for keyboard input, as shown in block 204 of FIG. 6.

If the user has pressed function key F10, as shown in block 233, the PFIT program is exited and control is turned over to the operating system of computer 12. In the preferred embodiment, the operating system is the IBM Disk Operating System (DOS).

FIG. 8 describes the flow of the Inject subroutine called in block 222 of FIG. 7. After the user has pressed the F1 key, data from main menu 401 (FIG. 14) is checked to see if it is valid in decision block 241. Note that the data in menus 421 and 441 (FIGS. 15 and 16) need not be checked since any data other than a "0" or "1" in PFIT data menu portions is ignored. If the data in main menu 401 is not valid, the subroutine returns back to FIG. 7 where a error message is displayed by block 225. The program then waits for keyboard input, as shown in block 204 of FIG. 6. If the data is valid, the flow of control continues in FIG. 9. If the data in main menu 401 is valid, the flow of control goes to FIG. 9.

Turning now to FIG. 9, as well as FIGS. 2, 3, 4, 14, 15, and 16, compare data from compare menus 421 and 441 is loaded to hardware in block 251. Load data memory line 31 (FIG. 2) is enabled and data travels on PFIT data bus 42 to data memory register 57 (FIG. 3). Up to 15 words of thirty-two bits each are loaded from bus 42. Since data bus 42 is only an eight bit bus, four cycles are required to load each thirty-two bit word into register 57.

Mask data from compare menus 421 and 441 [a mask is created from any data in PFIT data menu portions 422 and 442 other than "0" or "1"] is then loaded to hardware in block 252. Load mask memory Line 30 (FIG. 2) is enabled and data travels on PFIT data bus 42 to mask memory register 58 (FIG. 3). Up to 15 words of thirty-two bits each are loaded from bus 42. Since data bus 42 is only an eight bit bus, four cycles are required to load each thirty-two bit word into register 58.

For both data memory register 57 and mask memory 58, the proper address must be on address bus 62 when either load data memory line 31 or load mask memory line 30 is active low. This is because up to 15 words may be stored in each register and the words must be stored in the proper locations within each register so that they may be recalled later in the proper order.

To ensure that each word is stored in its proper location, memory address latch 59 and memory address counter 61 are loaded with the proper address through data bus 42 when load memory counter latch line 29 is active. Counter latch 59 is attached to memory address counter 61 by bus 65. The address then will be present on address bus 62 when the load data memory line 31 or load mask memory line 32 is active.

When all of the words have been loaded into data memory register 57 and mask memory register 58, memory counter latch 59 and memory address counter 61 are re-initialized with the address of the first word in the memory registers.

In operation, the count of memory address counter 61 is used to address each of memories 57 and 58 through address bus 62. As address counter 61 is decremented by count signal on line 63, address bus 62 steps sequentially through the thirty-two bit words stored in memories 57 and 58 and causes each of those words to appear sequentially on thirty-two bit compare data bus 64 and thirty-two bit mask data bus 66, respectively. When address counter 61 is decremented to zero, −LAST COUNT line 92 goes active low. This forces output line 117 of AND gate 118 to go low which reloads address counter 61 from memory counter latch 59 with the original count.

Referring again to FIG. 9, clock status 403 from main menu 401 (FIG. 14) is then loaded to hardware in block 253. If the user has specified "POS" as clock status 403, line 131 is low and line 132 is high (FIG. 3). Load clock status line 28 is enabled, and input line 133 to AND gate 86 is double inverted line of external clock 48. If the user has specified "NEG" as clock status 403, line 131 is high and line 132 is high (FIG. 3). Load clock status line 28 is enabled, and input line 133 to AND gate 86 is an inverted line of external clock 48. If the user has specified "NONE" as clock status 403, line 132 is low (FIG. 3). Load clock status line 28 is enabled, and input line 133 to AND gate 86 is always high.

Sequence count 404 from main menu 401 (FIG. 14) is then loaded to hardware in block 254 with a twelve bit count. Load sequence count line 32 (FIG. 2) is enabled and the sequence count data travels on PFIT data bus 42 through sequence counter latch 111 and latch output 112 to sequence counter register 56 (FIG. 3). Output 112 of latch 111 is used to load sequence counter 56 when output line 113 of AND gate 114 is low. Output line 113 is low when either load sequence count line 32 is active low or when -MATCH line 116 is active low. Since bus 42 is only an eight bit bus, two cycles are required to load the twelve bit count into latch 111.

Retry count 406 from main menu 401 (FIG. 14) is then loaded to hardware in block 256 (FIG. 9). Load retry counter line 25 (FIG. 2) is enabled and the retry count data travels on PFIT data bus 42 to retry counter 69 (FIG. 4).

The control register from main menu 401 is then loaded to hardware in block 257 (FIG. 9). Load control line 34 (FIG. 2) is enabled. Control bits are loaded to hardware through control latch 134 via delay control line 136, duration control line 137, and enable retry line 138 (FIG. 4). Lines 136–138 tell the hardware if the delay is 0 or greater than 0, if the bug is solid or intermittent, and if to allow for retry or not, respectively.

Duration 408 from main menu 401 (FIG. 14) is then loaded to hardware in block 258 (FIG. 9). Load duration counter line 26 (FIG. 2) is enabled and the duration data travels on PFIT data bus 42 through duration counter latch 122 to duration counter register 68 (FIG. 4). Output bus 127 of duration counter latch 122 is used to load duration counter 68 when output line 128 of AND gate 126 is low. Output line 128 is forced low when either load duration counter line 26 is active or when duration counter 68 is decremented to zero.

Delay 409 from main menu 401 is then loaded to hardware in block 259. Load delay counter line 27 (FIG. 2) is enabled and the delay data travels on PFIT data bus 42 through delay counter latch 121 to delay counter register 67 (FIG. 4). Output bus 123 of delay counter latch 121 is used to load delay counter 67 when ouptut line 129 of AND gate 124 is low. Output line 129 is forced low when either load delay counter line 27 is active or when delay counter 67 is decremented to zero.

Bug number (test pin) 411 and bug level 412 from main menu 401 (FIG. 14) are then loaded to hardware in block 261 and block 262 (FIG. 9). Load fault line 24 (FIG. 2) is enabled and the eight bit word containing bug number and bug level data travels on PFIT data bus 42 to fault latch 71. Four bits of the eight bit word are used to constitute the fault data on bus 51. These four bits are the lowest four bits of bug number (test pin) 411. The software combines the highest two bits of bug number (test pin) 411 with the bit contained in bug level 412 to form three bits of information. These three bits are then decoded by decoder 72 to activate one bit of the eight bits contained in enable fault busses 52 and 53. If the user has specified a bug level of zero as bug level 412, the data travels on enable fault low bus 52. If the user has specified a bug level of one as bug level 412, the data travels on enable fault high Bus 53. In this manner, one fault injection line is ready to inject the user-specified fault when fault line 54 is active low.

The last bit of the eight bit word is used as disable hard inject line 73. When active, disable hard inject line 73 disables the hardware control of the injection of the desired fault so that a solid fault can be simulated.

The flow of control of the inject subroutine called in block 222 of FIG. 7 continues in FIG. 10. If the user specified a solid bug type as bug type 413 of main menu 401 (FIG. 14), as determined by decision block 271, the injection hardware is started in block 272. A solid fault occurs when duration control line 137 is at low level (FIG. 4). This disables AND gate 74 thereby preventing a clocking signal from reaching duration counter 68. In addition low disable hard inject line 73 causes NAND gate 76 to present a high signal to AND gate 77. Thereafter, enable fault line 54 is solely controlled by stop/reset line 22 and inject fault line 23 via NAND gate 78 and AND gate 77. Stop/reset line 22 is active low and, during normal operation, will present a high signal to NAND gate 78. When inject fault line 23 is active low, indicating that the user wishes to inject a solid fault, the inverting input of NAND gate 78 will force its output low thereby forcing enable fault line 54 to its active low state. When fault inject line 23 returns to its inactive high state, enable fault line 54 will also return to its inactive high state.

The solid bug is not terminated until an abort command is received from the keyboard, as determined in decision block 273 (FIG. 10). In the preferred embodiment, the abort command is a CTRL + BREAK key sequence. When the abort command is received, the inject error flag is set in block 274, and stop/reset Line 22 (FIG. 2) is enabled in block 276, thus resetting the hardware. The inject subroutine then returns back to FIG. 7 where an error message is displayed by block 225. The program then waits for keyboard input, as shown in block 204 of FIG. 6.

If the user specified an intermittent bug type as bug type 413 in main menu 401 (FIG. 14), the compare hardware is started in block 282 (FIG. 10). Initially, the borrow (BOR) outputs of each of counters 61, 67, 68, and 69 are in the high state which causes NAND gate 81 to produce a high signal on retry line 82 (FIG. 4). Before start, start line 33 is high which is combined with the high signal on retry line 82 to cause AND gate 83 to present a high signal to the preset input (PR) of retry latch 84 (FIG. 3). Both the PR input and clear (CL) input of latch 84 are active low thus the output of latch 84 is low prior to start thereby disabling AND gate 86.

When the compare hardware is started in block 282 (FIG. 10), start line 33 is enabled causing AND gate 83 to set latch 84 thereby enabling AND gate 86 (FIG. 3). AND gate 86 can also be enabled and disabled by output line 133 under control of enable clock line 28. Latch 87 and logic gates 139, 141, 142 and 143 act as a 2:1 selector circuit. Output line 133 is high when input line 132 is low, thus indicating no clocking. Output line 133 tracks the positive external clock when input line 131 is low and input line 132 is high, and tracks the negative external clock when input line 131 is high and input line 132 is high.

Once AND gate 86 is activated by both retry latch 84 and NOR gate 139, AND gates 88 and 89 and NOR gate 91 operate to compare bit-0 of the first word stored in data memory 57 with bit-0 appearing on compare data bus 47. This comparison can be masked by bit-0 of the first word stored in mask memory 58. If bit-0 of mask memory 58 holds a "0", both AND gates 88 and 89 are disabled thereby causing NOR gate 91 to always produce a high output regardless of the actual values of the bits-0 of busses 47 and 64. If bit-0 of mask memory 58 holds a "1", each of AND gates 88 and 89 is active causing NOR gate 91 to produce a high output only when bit-0 of data memory 57 equals bit-0 of compare data bus 47. This high signal is, in turn, presented to AND gate 86.

The circuit of AND gates 88, 89 and NOR gate 91 is repeated thirty-two times for each of bits I0-I31 on compare data bus 47. AND gate 86 thus produces a high signal on count line 63 whenever all bits that are not masked in bus 64 (D0-D31) are equal to all corresponding unmasked bits of compare data bus 47 (I0-I31). Then and only then will AND gate 86 produce a high signal on count line 63. AND gate 86, latch 84, AND gates 88, 89, and NOR gate 91, together with AND gates and NOR gates (not shown) necessary to compare bits 1–31, constitute compare logic 90.

When count line 63 is activated by a successful word compare by AND gate 86, several events occur. First, memory address counter 61 is decreased so that the next word in both data memory 57 and mask memory 58 is addressed.

If counter 61 has not yet decremented to zero, indicating that at least one more word remains in memories 57 and 58 for comparison, the stored data word is presented on bus 64, the compare data is presented on bus 47 and the mask data is presented on bus 66 for operation of compare logic 90 similar to that described earlier regarding the first word. If instead address counter 61 has decremented to zero, indicating that there are no more words to be addressed in memories 57 and 58, the BOR line 92 of counter 61 becomes active low. Last count line 92 is used as a clock signal to decrement sequence counter 56 and is also presented, in inverted form, along with count line 63, to AND gate 93. Last sequence count line 94 is also presented in inverted form to AND gate 93.

The count stored in sequence counter 56 is decremented by "1" when last count line 92 goes low. If sequence counter 56 has not decremented to zero, last sequence line 94 (BOR of counter 56) remains high. When last count line 92 is low and last sequence line 94 is high, memory address counter 61 is reloaded with the count stored in memory counter latch 59 in preparation for sensing another occurrence of the same event stored in data memory 57. This process continues until sequence counter 56 is decremented to zero.

When sequence counter 56 is eventually decremented to zero, last sequence line 94 is forced low. The low signal on line 94 is presented in inverted form to AND gate 93 along with the inverse of the low signal on last count line 92 along with the high signal on count line 63. This combination causes AND gate 93 to produce a high signal on match line 96.

A high signal on match line 96 signifies that the event stored in data memory 57 has occurred a specified number of times equal to the original count stored in sequence counter 56. In the preferred embodiment the sequence count can equal up to 4096 although it would be within the ability of a skilled artisan to increase this maximum.

The high signal on match line 96 is presented in inverted form to AND gate 95 which, in turn, presents a low signal to the clear (CL) input of retry latch 84 thereby disabling AND gate 86.

Referring now to FIG. 4, match line 96 is attached to both AND gate 97 and NAND gate 144. The high signal on match line 96 will enable AND gate 97 allowing clocking signals generated by oscillator 98 to begin decrementing delay counter 67.

The effect the high signal on match line 96 will have on NAND gate 144 is dependent upon the state of delay control line 136. If delay control line 136 is low, then the output of NAND gate 144 will always be high regardless of the state of match line 96. However, if delay control line 136 is high, then a high signal on match line 96 will cause the output of NAND gate 144 to be low. This will be presented to AND gate 77 and will force enable fault line 54 low. A low level on enable fault line 54 will enable one of the four injection pods described earlier, and cause a fault to be injected into system under test 16. Thus, the high level of delay control line 136 is used to cause a delay of essentially zero between the time a match is detected and the time a fault is injected into system under test 16.

For a delay of greater than zero, delay control line 136 will be inactive low and the delay will be controlled by delay counter 67. When delay counter 67 decrements to zero, delay complete line 99 (BOR of counter 67) goes low. The low signal on delay complete line 99 is presented, in inverted form, to AND gate 74, and since duration control line 137 is inactive high, AND gate 74 begins applying clocking signals generated by oscillator 98 to duration counter 68.

In addition, the low signal on delay complete line 99 is presented to NAND gate 76 in inverted form along with a high signal on disable hard inject line 73, the output of AND gate 101, and delay control line 136. The output of AND gate 101 is high during the time period when duration counter 68 is counting because duration complete line 102 is high.

Thus, NAND gate 76 presents a low signal to one input of AND gate 77, a high signal is presented to the second input of AND gate 77 from NAND gate 78 and the output of NAND gate 144 presents a high signal to the third input of AND gate 77. This causes AND gate 77 to produce an active low signal on enable fault line 54 which activates one of the four injection pods, described earlier, to inject a fault into the system under test.

The low signal will continue on enable fault line 54 while duration counter 68 is counting. When counter 68 reaches zero, duration complete line 102 (BOR of counter 68) moves from high to low. This causes the output of NAND gate 76 to move from low to high causing AND gate 77 to force enable fault line 54 to an inactive high state thereby stopping the injection of the fault.

When enable fault line 54 moves from active low to inactive high, the output of AND gate 146 goes high. This causes retry counter 69 to decrement by "1". If no more retrys are to occur, retry counter 69 will have reached zero which will cause inject complete line 104 to move from inactive high to active low causing retry line 82 to be inactive high via NAND gate 81. This, in turn, blocks activation of AND gate 86 (FIG. 3).

If retry counter 69 has not decremented to zero, NAND gate 81 will force retry line 82 to become active low at the end of the count of duration counter 68. This will reactivate AND gate 86 via retry latch 84 which allows compare logic 90 to begin detecting for the occurrence of another event within system under test 16 (FIG. 1).

If at any time in the above procedure an abort command is received from the user, as determined in decision block 283 (FIG. 10), the inject error flag is set in block 274, and stop/reset line 22 (FIG. 2) is enabled in block 276, thus resetting the hardware. The inject subroutine then returns back to FIG. 7 where an error message is displayed by block 225. As long as an abort command is not received from the user, the control continually reads the status of the hardware, as shown in block 284, by enabling read status line 21 (FIG. 2). When read status line 21 is enabled, the contents of status buffer 106 are checked to see if the task the user has specified is complete. Status buffer 106 is used to store the values of the four lines delay complete 99; duration complete 102; inject complete 104; and match 96. If status buffer 106 indicates that the task is not complete, the control looks again to see if an abort command has been sent, decision block 283, and reads the status of the hardware again. As soon as the task specified by the user has completed, as determined by decision block 286, stop/reset line 22 (FIG. 2) is enabled in block 276, thus resetting the hardware. The inject subroutine then returns back to FIG. 7. Decision block 234 determines that no error flags have been set, and displays an inject good message in block 236. The program then waits for keyboard input, as shown in block 204 of FIG. 6.

The program stops when the user presses function key F10, as shown in block 233. When function key F10 is pressed, the PFIT program is exited and control is turned over to the operating system of computer 12.

Figure 11:
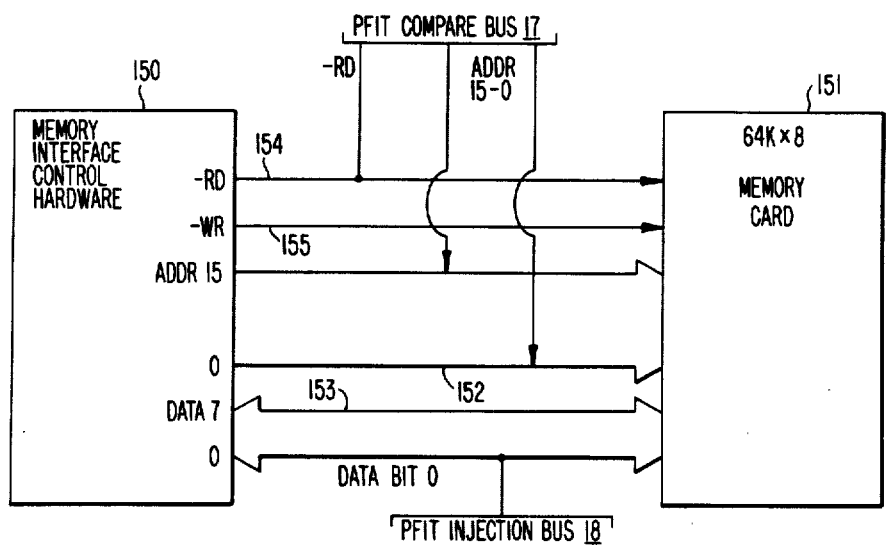
FIG. 11 is an example of an application of the present invention.
Figure 12:
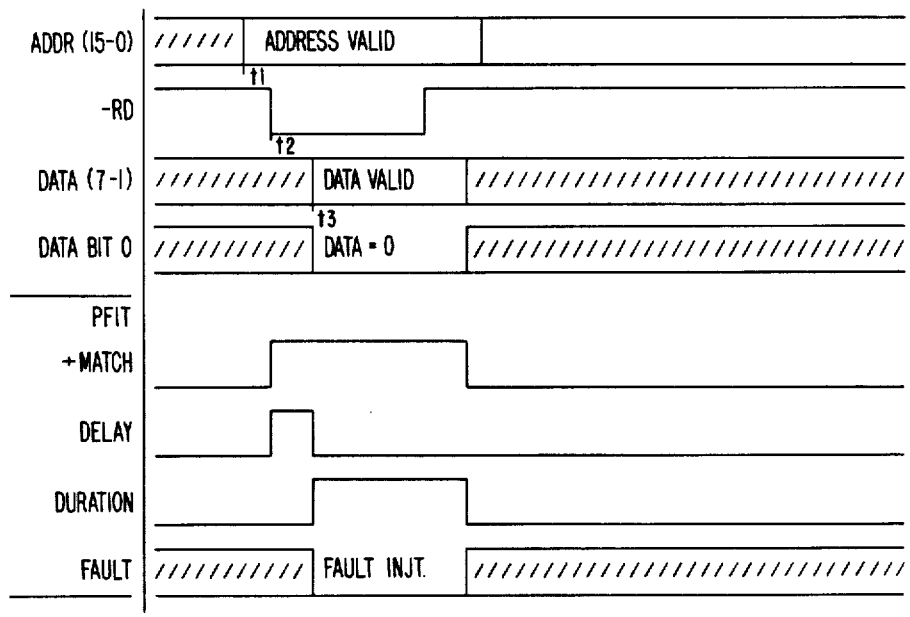
FIG. 12 is a timing diagram associated with the example of an application of the present invention shown in FIG. 12.

Referring now to FIGS. 11 and 12, a simple example of the PFIT is illustrated. In a typical memory interface connection designed to read and write a 64K byte block of memory, memory interface control hardware 150 is connected to memory 151 by sixteen bit address bus 152, eight bit data bus 153, and read and write lines 154 and 155, respectively.

During normal read operation, a sixteen bit address is applied at time $t_1$ to memory 151 by hardware 150. This addresses a single eight bit byte of memory. A predetermined time later at time $t_2$ determined by hardware 150, read line 154 becomes active low causing the selected byte to appear on data bus 153 at time $t_3$ after a predetermined delay. The data on bus 153 is then used by hardware 150.

To inject a fault into the digital processing system of FIG. 7, prior techniques would, for example, select one bit line of bus 153 and tie it to ground or to a signal voltage. This would satisfactorily simulate a short circuited bit line but would fail to simulate a stuck bit or intermittent bit within memory 151.

The present invention can be applied to facilitate the predictable, repeatable simulation of fault conditions within memory 151. To accomplish this, the termination probes of compare bus 17 are attached to read line 154 and address bus 152 as shown in FIG. 11. A termination probe from injection bus 18 (FIG. 1) is also attached to data bit 0. Data memory 57 is then loaded with a word so that it will recognize when read line 154 is low and a particular address is on address bus 152. A delay and duration are loaded into delay counter 67 and duration counter 68, respectively. The PFIT is started by a low level on start line 33. The information on compare bus 17 will then be compared by compare logic 90 with the word stored in data memory 57. When a match is detected, the match line will go high as shown in FIG. 12. The delay stored in delay counter 67 will decrement and then the fault will be injected into data bit 0 on data bus 153 through injection bus 18. The duration counter will decrement to 0 and then the fault will be terminated.

In this particular example, assume data bit 0 of data bus 153 should be at a high level or equal to one. When the PFIT detects that read line 154 is low and the proper address is on address bus 152, it will start a delay as shown in FIG. 12. Then, when data bit 0 of data bus 153 would be going to a high level, the PFIT injects a fault through injection bus 18 and forces data bit 0 low. The fault will remain until the data on data bus 153 is no longer valid. Since the fault will only be injected when a particular address is on address bus 152, a single stuck bit within memory 151 has been simulated.

Whereas we have illustrated and described the preferred embodiments of our invention, it is understood that we do not limit ourselves to the precise constructions disclosed herein. We expressly reserve the right to all changes and modifications coming within the scope of the invention as defined in the appended claims.

We claim:

1. A user controlled apparatus for testing a fault tolerant digital processing system including:
   means, connected to said fault tolerant system, for detecting a predetermined event occurring in said system, wherein said predetermined event is a plurality of digital words occurring in a predetermined sequence within said system, each of said digital words comprising bit lines connected to voltage nodes within said system; and
   means, responsive to said means for detecting, for injecting a predetermined fault condition into said fault tolerant system; whereby the fault recovery performance of said fault tolerant system is determined.

2. An apparatus as recited in claim 1 wherein said means for detecting includes:
   digital memory means for storing said predetermined sequence of a plurality of digital words;
   means for comparing said stored sequence with a sequence of words measured from the system;
   means for indicating when said stored sequence matches said measured sequence; and
   means for activating said means for injecting upon a match.

3. An apparatus as recited in claim 2 wherein said detecting means further includes:
   mask memory means, connected to said digital memory means, for masking predetermined bits within words of said stored sequence;
   whereby the masked bits are not compared with the corresponding bit within the measured word.

4. An apparatus as recited in claim 1 wherein said means for injecting said predetermined fault condition further includes:
   means for forcing at least one voltage node in said system to an abnormal state.

5. An apparatus as recited in claim 4 wherein said means for injecting said predetermined fault condition injects said fault only after a predetermined plurality of identical events have occurred within the system.

6. An apparatus as recited in claim 5 wherein said means for injecting further includes:
   means for injecting said fault a predetermined time delay after said means for detecting detects said event.

7. An apparatus as recited in claim 6 wherein said means for injecting injects said predetermined fault for a predetermined time duration, thereby simulating an intermittent fault.

8. A user-controlled apparatus for predictably injecting a predetermined fault condition into a digital processing system including:
   means for detecting the occurrence of a predetermined event in said system, wherein said predetermined event is a plurality of digital words occurring in a predetermined sequence within said system, each of said digital words comprising bit lines connected to voltage nodes within said system;
   means, connected to said means for detecting, for counting a predetermined number of occurrences of said predetermined event;
   means, connected to said means for counting, for timing a predetermined time delay after said predetermined number of occurrences have been counted; and means, connected to said means for timing, for injecting a predetermined fault condition after said predetermined time delay into said digital processing system.

9. An apparatus as recited in claim 8 wherein said predetermined time delay is substantially zero.

10. An apparatus as recited in claim 8 wherein said predetermined fault condition is injected for a predetermined duration.

11. An apparatus as recited in claim 10 wherein said duration is infinite, thereby simulating a solid fault.

12. A method for testing a fault tolerant digital processing system, comprising the steps of:
- specifying a predetermined event, wherein said predetermined event is a plurality of digital words occurring in a predetermined sequence within said system, each of said digital words comprising bit lines connected to voltage nodes within said system;
- specifying a fault duration time;
- specifying a fault delay time;
- detecting the occurrence of said predetermined event; and
- injecting a fault, responsive to said detecting step, for said fault duration time after said fault delay time has elapsed.

13. A method for testing a fault tolerant digital processing system, comprising the steps of:
- specifying a predetermined event, wherein said predetermined event is a plurality of digital words occurring in a predetermined sequence within said system, each of said digital words comprising bit lines connected to voltage nodes within said system;
- specifying a fault duration time;
- specifying a fault delay time;
- specifying a sequence count;
- detecting the occurrence of said predetermined event; and
- injecting a fault, responsive to said detecting step detecting said event the number of times specified in said sequence count, for said fault duration time after said fault delay time has elapsed.

* * * * *